(12) United States Patent  <span style="float:right">(10) Patent No.: US 7,679,516 B2</span>
Mori  <span style="float:right">(45) Date of Patent: Mar. 16, 2010</span>

(54) WIRELESS TAG SYSTEM HAVING A PLURALITY OF ANTENNA FEEDING POINTS

(75) Inventor: Hidekazu Mori, Mishima (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 1003 days.

(21) Appl. No.: 11/368,765

(22) Filed: Mar. 6, 2006

(65) Prior Publication Data

US 2007/0096879 A1   May 3, 2007

(30) Foreign Application Priority Data

Mar. 11, 2005   (JP)   ............... 2005-068843

(51) Int. Cl.
*G08B 13/14* (2006.01)
*H04Q 5/22* (2006.01)
*H03C 7/00* (2006.01)

(52) U.S. Cl. ............... 340/572.7; 340/572.5; 340/10.5; 375/315

(58) Field of Classification Search ............ 340/572.7, 340/572.5, 10.5; 375/315; 455/73
See application file for complete search history.

(56) References Cited

U.S. PATENT DOCUMENTS

| | | | | |
|---|---|---|---|---|
| 6,317,027 | B1 * | 11/2001 | Watkins | 340/10.1 |
| 6,473,047 | B2 * | 10/2002 | Terashima et al. | 343/741 |
| 6,836,216 | B2 * | 12/2004 | Manov et al. | 340/572.7 |
| 7,388,499 | B2 * | 6/2008 | Hayashi et al. | 340/572.7 |
| 7,496,329 | B2 * | 2/2009 | Patel et al. | 455/41.2 |

FOREIGN PATENT DOCUMENTS

JP    07-162227    6/1995

\* cited by examiner

*Primary Examiner*—Benjamin C Lee
*Assistant Examiner*—Michael Shannon
(74) *Attorney, Agent, or Firm*—Pearne & Gordon LLP

(57) ABSTRACT

Receiving a switching control signal output from an Wireless tag reader/writer, a switching controller sequentially switches feeding points of an antenna unit, and the Wireless tag reader/writer is made to retain all information from information of an Wireless tag that initially communicates to information of an Wireless tag that finally communicates for each feeding point.

1 Claim, 1 Drawing Sheet

WIRELESS TAG SYSTEM HAVING A PLURALITY OF ANTENNA FEEDING POINTS

CROSS-REFERENCE TO RELATED APPLICATIONS

This application is based upon and claims the benefit of priority from the prior Japanese Patent Application No. 2005-68843, filed on 11 Mar. 2005; the entire contents of which are incorporated herein by reference.

BACKGROUND OF THE INVENTION

1. Field of the Invention

The present invention relates to an Wireless tag system having a plurality of antenna feeding points.

2. Description of the Related Art

Recently, radio data carriers that have set up therein an inherent radio frequency ID (RFID), have a memory area in which information can be rewritten, and read out their RFID or write and read out arbitrary information in a noncontact manner using radio are coming into use.

For example, mail articles and deliveries are made to have attached thereto or built therein respectively a radio data carrier having an inherent RFID so as to identify such mobile objects.

Meanwhile, when mail articles and deliveries are piled up, the resonance frequency of Wireless tag fluctuates from a designed resonance frequency due to the mutual inductance of respective Wireless tag. Thus, the resonance syntony state with a reader/writer comes to be out of alignment, and an electric power that is fed from a reader/writer to Wireless tag is lowered, which deteriorates the communication performance.

Accordingly, there is suggested a technique in which, even if the resonance frequency of Wireless tag comes to be out of alignment, the transmission frequency is changed in turn by a frequency scan circuit so that the effective frequency band within which communication with an Wireless tag is sufficiently possible in the transmission frequency sent from a transmitting antenna covers resonance frequency fluctuation ranges of all Wireless tag (Jpn. Pat. Appln. Laid-Open Publication No. 2000-227947).

As a frequency band used in a Wireless tag for managing an object, a microwave band of 2.45 GHz is used in Japan. In many cases, the transmission frequency band cannot be easily changed. There is raised a problem that, in case Wireless tag are densely located, or sparsely located, a reading system is not realistic since the transmission frequency band is changed.

BRIEF SUMMARY OF THE INVENTION

According to an embodiment of the present invention, an object of the present invention is to provide an Wireless tag system that can always read out all Wireless tag even if a plurality of Wireless tag densely exist or sparsely exist.

The present invention may provide an Wireless tag system, comprising: a plurality of Wireless tags each of which has molded therein an IC chip and an antenna; an antenna unit for transmitting and receiving electric waves with antennas built in the Wireless tag, the antenna unit having a plurality of feeding points; an Wireless tag reader/writer for performing communication control with the Wireless tag through the antenna unit, and for performing protocol exchange between an upper device and the Wireless tag; and a switching control means for switching the feeding points of the antenna unit, the switching control means being controlled by the Wireless tag reader/writer.

DETAILED DESCRIPTION OF THE INVENTION

Figure 1:
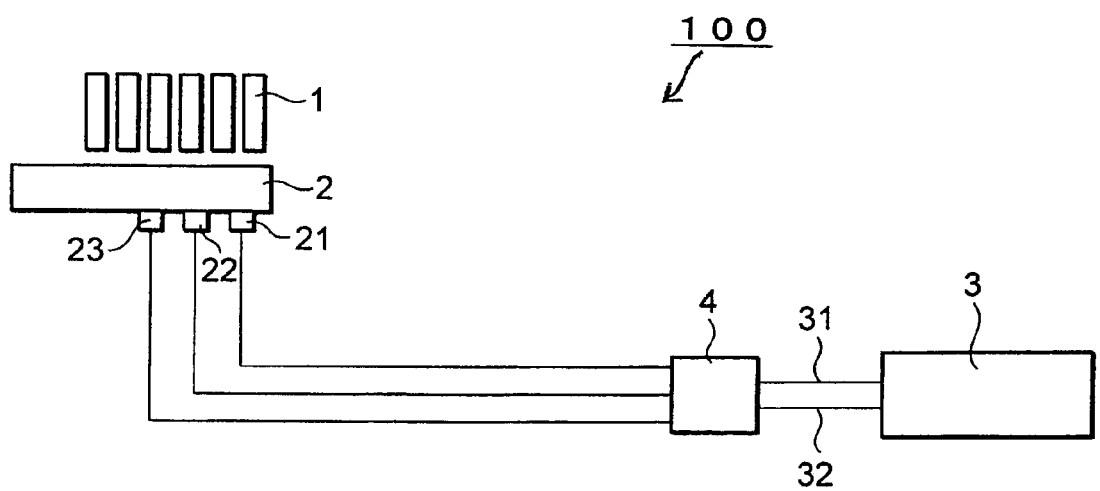
FIG. 1 shows a block diagram indicative of the configuration of the Wireless tag system according to an embodiment of the present invention.

The Wireless tag system according to one embodiment of the present invention will further be described below with reference to the accompanying drawing.

As shown in FIG. 1, an wireless tag system 100 includes a plurality of Wireless tag 1 each of which has molded therein an IC chip and an antenna, an antenna unit 2 for transmitting and receiving electric waves with antennas built in the Wireless tag 1, which has a plurality of feeding points, an Wireless tag reader/writer 3 for performing communication control with the Wireless tag 1 through the antenna unit 2, and for performing protocol exchange between an upper device, not shown, and the Wireless tag 1, and a switching control means 4 for switching the feeding points of the antenna unit 2, which is controlled by the Wireless tag reader/writer 3.

The Wireless tag 1 is of a kind of radio data carrier, and is an independent component having unitedly formed on a basal plate thereof a tag antenna capable of transmitting and receiving electric waves and an IC chip. The IC chip includes a power generation unit for supplying power to respective parts of the IC chip by rectifying and stabilizing a modulated electric wave received by the tag antenna, a demodulation unit for demodulating a modulated electric wave to send thus demodulated data to a control unit, a modulation unit for modulating data sent from the control unit to send thus modulated data to the tag antenna, the control unit for writing data demodulated by the demodulation unit to a memory and for reading out transmission data from the memory to send thus read out data to the modulation unit, and the memory.

The memory has a radio ID area in which inherent RFID which is allocated and set up by a manufacturer when manufacturing the Wireless tag is stored, and a user area to which the user can write arbitrary data. The user area has recorded therein inherent codes for pursuit and management of mail articles and deliveries which have attached thereto or built therein respectively the Wireless tag.

The Wireless tag reader/writer 3 has arranged at the inside or outside thereof a transmitting and receiving antenna, and reads out memory data of all the Wireless tag located within the communication area of the transmitting and receiving antenna in a noncontact manner.

In FIG. 1, the antenna unit 2 working as a transmitting and receiving antenna is arranged at the outside of the Wireless tag reader/writer 3. The Wireless tag reader/writer 3 is connected to an upper device such as a personal computer, and includes an interface unit for sending and receiving data, a control unit having a CPU for controlling the communication with Wireless tag and a connected hardware, a ROM having stored therein operation programs, and a RAM having temporarily stored therein data, etc., a modulation unit for modulating data sent from the control unit to generate a modulated signal suitable for radio communication, a transmission amplifier for amplifying a modulated signal and making a transmitting and receiving antenna radiate thus amplified modulated signal as an electric wave, a reception amplifier for amplifying an electric wave signal received by the antenna unit 2, and a demodulation unit for demodulating data of thus amplified electric wave signal to send thus demodulated data to the control unit.

In communicating with the Wireless tag 1, a carrier signal is modulated at a transmission unit to be transmitted from a transmitting antenna as an electric wave signal for electric power, and then data to be transmitted is so modulated as to be superposed on the electric wave signal for electric power at the transmission unit to be transmitted from the transmitting antenna.

When the Wireless tag 1 is placed within the induction field formed by the antenna of the Wireless tag reader/writer 3, a voltage is induced at an antenna coil of the Wireless tag 1 due to the electromagnetic induction brought about between the antenna coil of the Wireless tag 1 and a transmitting antenna coil of the Wireless tag reader/writer 3. The Wireless tag 1 is operated using the voltage or electric power energy, and communicates with the CPU of the Wireless tag reader/writer 3. The antenna coil of the Wireless tag reader/writer 3 can work as a transmitting antenna as well as a receiving antenna.

An electric wave signal transmitted from the Wireless tag 1 is received by a receiving antenna, and is demodulated at a reception unit to be discriminated as data. The CPU temporarily stores the data demodulated at the reception unit in the RAM, and then transmits the data through a communication unit. There are a multi-read mode to communicate with all the Wireless tag located within the communication area of the antenna, a single-read mode to assign an ID number of an Wireless tag and read out data from the corresponding Wireless tag, and a single-write mode to assign an ID number of an Wireless tag and write data to the corresponding Wireless tag.

As described above, the antenna is a component that configures a part of the RFID and Wireless tag reader/writer, forms an electromagnetic field and transmits and receives an electric wave.

In case of the electric wave communication system (hertz system), so as to enlarge area to catch an electric wave, a planar patch antenna is used.

As for a receiving antenna on the Wireless tag, in case the wavelength determined by a corresponding frequency is $\lambda$, the resonance characteristics are obtained when the length of the antenna is $\frac{1}{2}\lambda$, and an electric wave signal can be caught effectively. Thus, an electric wave is radiated forward using a planar plate which resonates at $\frac{1}{2}\lambda$.

It is desirable that a plurality of patch antennas be combined, and outputs be synthesized to radiate an electric wave having directivity. Furthermore, a planar patch antenna that outputs not an electric wave of linear polarization but an electric wave of circular polarization that transmits with its polarization plane rotated may be used.

Communication can be stably carried out when the antenna of the Wireless tag reader/writer 3 and the antenna of the Wireless tag 1 face each other, and generally, the planar patch antenna being a transmitting antenna has its feeding point impedance set to 50Ω.

In case the plural Wireless tag 1 line up, when reading out the plural Wireless tag 1 at one time, due to the characteristics of electric waves, in case the Wireless tag 1 are densely located, the feeding point impedance of the transmitting antenna fluctuates, and there is undesirably raised a deviance between the impedance of the transmitting antenna and the impedance of the Wireless tag 1. Similarly, in case the Wireless tag 1 are sparsely located, the feeding point impedance fluctuates. In case impedance matching is not attained, it becomes impossible to identify all the Wireless tag 1 accurately.

In the present invention, the planar patch antenna as the antenna unit 2 is provided with a plurality of feeding points 21, 22, 23. As for the feeding point, so as to attain accurate impedance matching, the gamma-matching is performed to determine the feeding point. There may be employed a simple configuration in which a coax being a feeder line is attached to plural points of a radiator of the planar patch antenna.

In the present invention, when the impedance of the transmitting antenna and the impedance of the Wireless tag 1 deviate from each other, the deviance of impedance is corrected by changing the feeding position of the transmitting antenna.

That is, receiving a switching control signal 31 output from the Wireless tag reader/writer 3, the switching control means 4 can sequentially switch the feeding points of the antenna unit 2. When the feeding position of the transmitting antenna is changed by the switching control means 4, the impedance is changed. Thus, for each feeding point, there are raised Wireless tag 1 which can communicate with the Wireless tag reader/writer 3 and Wireless tag 1 which cannot communicate with the Wireless tag reader/writer 3. When communicating with the largest number of Wireless tag 1, it can be determined that the number is the total number of the Wireless tag.

Accordingly, it becomes possible to carry out the matching of impedance by changing the feeding position of the transmitting antenna, and all the Wireless tag 1 can be read out even if the Wireless tag 1 densely exist or sparsely exist.

It is also possible to sequentially switch the feeding points 21, 22, 23, and make the Wireless tag reader/writer 3 retain all information from information of an Wireless tag that initially communicates to information of an Wireless tag that finally communicates for each feeding point. In this way, it is possible to avoid a devious processing of firstly determining a feeding point where matching of impedance is attained most, communicating with all the Wireless tag at thus determined feeding point anew, and obtaining individual information of the respective Wireless tag.

As has been described above, according to the embodiment of the present invention, even if a plurality of Wireless tag densely exist or sparsely exist, all the Wireless tag can be read out at any time.

While the invention has been described hereinbefore, it should be understood that the invention is not limited to the embodiment, but various modifications, alternative constructions or equivalents can be implemented without departing from the scope and spirit of the present invention. Furthermore, various inventions can be realized by arbitrarily combining the plural components disclosed in above-described embodiment. For example, some components may be omitted from all the components indicated in the embodiment.

What is claimed is:

1. An Wireless tag system, comprising:
a plurality of Wireless tags each of which has molded therein an integrated circuit chip and an antenna;
a planar patch antenna unit for transmitting and receiving electric waves with antennas built in a Wireless tag, the antenna unit having a plurality of feeding points;
an Wireless tag reader/writer for performing communication control with the Wireless tag through the antenna unit, and for performing protocol exchange between an upper device and the Wireless tag; and
a switching control means for switching the feeding points of the antenna unit, the switching control means being controlled by the Wireless tag reader/writer, wherein the switching control means is built in the Wireless tag reader/writer, wherein, when communicating with the plural Wireless tags at one time, the switching control means switches the feeding points of the antenna unit, and a channel that can read out the most Wireless tags is set up, and wherein the feeding points of the antenna unit is sequentially switched, and individual information of all the Wireless tags which can communicate is retained for each feeding point.

* * * * *